3,403,017
HERBICIDAL COMPOSITION AND METHOD COMPRISING 1 - (TETRAHYDRODICYCLO-PENTADIENYL)-3,3-DIMETHYL UREA AND A SALT OF METHYL ARSONIC ACID
James W. Rawson, Tarleton, Del., assignor to Hercules Incorporated, a corporation of Delaware
No Drawing. Filed Sept. 23, 1965, Ser. No. 489,721
4 Claims. (Cl. 71—97)

ABSTRACT OF THE DISCLOSURE

Weeds in cotton fields are inhibited in growth by applying a mixture of 1-(tetrahydrodicyclopentadienyl)-3,3-dimethyl urea and a salt of methyl arsonic acid in the ratio of 1:3 to 1:1 to the weeds at a rate of 1 to 6 pounds of said mixture per acre.

---

This invention relates to new herbicide compositions and to methods for controlling weeds therewith.

The great variety of weeds growing in row crops requires a broad spectrum herbicide which is effective over a wide range of growing conditions. Moreover, it is particularly desirable to obtain a fast kill of the weeds early in the growing period of the desired crop.

Monosodium methyl arsonate (known as MSMA) and disodium methyl arsonate (known as DSMA) are useful under certain conditions for controlling weed growth. However, the timing of their use is critical and their effectiveness on succulent weeds growing under moist conditions is not as high as desired. Their activity is greatly reduced by the appearance of damp cool weather following their use and a second treatment to overcome the revival of weed growth is made difficult by the wet conditions of the fields. While the short residual life of MSMA (or DSMA) under moist field conditions can be overcome by repeated applications, the toxicity to the crop must be considered.

In accordance with the present invention, it has now been found that the deficiencies of salts of methyl arsonate are overcome by using a combination of methyl arsonate salt and norea as a herbicide composition and applying the combination composition to a mixed growth of weeds to be controlled.

Norea, which is 3-(3a,4,5,6,7,7a-hexahydro-4,7-methanoindan-5-yl)-1,1-dimethyl urea (also known as 1-tetrahydrodicyclopentadienyl-3,3-dimethyl urea), is prepared stepwise from dicyclopentadiene by: step (1) reaction with HSCN to form the isothiocyanate, A; step (2) reaction of A with dimethyl amine to form the thiourea, B; step (3) hydrolysis of B to form the urea, C; step (4) hydrogenation of C to form norea.

Methyl arsonic acid and its salts are well known in U.S. 2,889,347 to Schwerdle and its utility as a crabgrass herbicide is known in U.S. 2,678,265 to Schwerdle. Sodium salts of methyl arsonic acid are preferred but amine salts such as ammonium salts, ethanol amine salts, diethanol amine salts, triethanol amine salts, pentyl amine salts, octyl amine salts and the like may also be used.

In the course of the development of this invention, it has been found that norea is a particularly good herbicide against weeds in their early stages of succulent growth where MSMA is ineffective and thus norea complements the MSMA under those climatic conditions where the MSMA activity is impaired. It also supplements the MSMA against those weeds which are generally resistant to MSMA under any climatic conditions. In the combination of norea and MSMA, moreover, the norea has a longer residual life and is actually activated by the moist conditions which cause deterioration in the activity of the MSMA. As a result of the complementary and supplementary activity imparted by the norea, there is obtained a much faster kill of weeds and a better control by the combination of the two herbicides than by either one alone.

The composition of this invention is particularly useful in controlling weed growth in cotton fields where the climatic variations make control difficult with MSMA alone. However, the composition is useful in any field where there is a broad spectrum of weeds.

In the compositions of this invention, norea and DSMA or MSMA are used in a ratio in the range of about 1:3 to 1:1, to produce a composition which can be used against all types of broad leaf plants and grasses without harming the cotton when applied at the rate of 1 to 6 pounds of the composition per acre.

The composition of norea and methyl arsonate salts is particularly useful as a complete herbicide for weeds in cotton fields and is not harmful to cotton in dosages requisite for the control of weeds.

The use of compositions of norea and methyl arsonate and salts thereof is illustrated by the following examples in which the 80% norea is Herban (reg. U.S. Patent Office), a composition in which the other components are 14% clay (Attasorb), 3% dispersing agent and 1.5% wetting agent, the MSMA is 23% arsenic, and the added surfactant is dodecyl ether of poly(ethylene glycol).

Example 1

A composition of 0.375 pound 80% norea, and 1 pound MSMA (23% arsenic) was dispersed in 12.5 gallons water containing ½% surfactant and this composition was sprayed on a one acre cotton field with the spray directed to two 6–7 inch contiguous bands on either side of the row of cotton plants. The cotton plants were in the 6–8 leaf stage and the weeds included morning glory (1–3 inch), cocklebur (1–6 inch), hurrah grass (1–4 inch) and crabgrass (1.5–3 inch) along with a mixed variety of smaller broadleaf plants. The spray was directed onto the weeds but below the leafy part of the cotton plants. The actual area covered by the band spraying was about ⅓ acre, the cotton rows being about 40 inches apart.

Another acre was similarly treated with 0.375 pound norea in 12.5 gallons of water containing ½% surfactant per acre directed only on a 10–12 inch band but sprayed above the cotton leaves.

Twelve days after treatment there was no damage to the cotton plants in any of the cotton fields, but all of the weeds were killed in the areas treated with compositions containing norea, the most rapid kill occurring in the norea-MSMA treated field.

Example 2

A composition of 1 pound 80% norea, 1 pound MSMA in 36 gallons of water containing ½% surfactant was sprayed on an acre of cotton, the spray being directed from above on both cotton (Landpark variety in 2-leaf to 8-leaf stage) and weeds in the field. The weeds included both broadleaf and grasses—cocklebur (1–7 inch), morning glory (1–3 inch) and crabgrass (1–2 inch) being present. The treatment killed all weeds in 5 days with only slight damage to the true leaves of the cotton plants. In a similar treatment with 1 pound of norea in 36 gallons of water containing ½% surfactant per acre the weeds and grasses were yellowed but were still living even after 20 days.

Example 3

A composition of 0.75 pound 80% norea and ½ pound MSMA in 10–12 gallons of water containing ½% surfactant was sprayed on a cotton field infested with weeds and grass among which were cockleburs 5–6 inches tall; the spray was directed above the cotton plants to cover two contiguous 6–7 inch bands on either side of the cotton plants. After 4 days the cocklebur plants were dead and the remaining weeds were in a dying state. The cotton plants were not seriously harmed. Since weeds in the cotton row did not receive sufficient spray due to the protective cover of the cotton leaves, a second spraying was required.

Example 4

A composition of 0.5 pound 80% norea, 1.5 pounds MSMA was diluted with 10–12 gallons of water containing ½% surfactant to form a suspension. This suspension applied to an acre field of cotton (12 inch plants) killed all the weeds including nutgrass and one-half of the Bermuda grass without harming the cotton. A similar composition differing only in containing no norea only stunted the nutgrass and Bermuda grass while killing crabgrass and Johnson grass.

Example 5

A concentrate of 2.5 pounds 80% norea and 3⅓ pints of MSMA (6.6 pounds per gallon) were mixed with one quart of surfactant and diluted with water to make one gallon. This concentrate was then diluted with water at the rate of one gallon per 50 gallons of water to form a suspension. This suspension was sprayed on four acres of cotton directing the spray below the leaf level of the cotton plants. This effectively destroyed all weeds growing in the cotton rows.

Example 6

A moist field containing a dense stand of small weeds was disked and planted with cotton seeds in 20 foot rows. Adjacent pairs of rows were taken for spray tests. The timing of spraying was at the cotyledon stage, the first true leaf stage and the 2–3 leaf stage for the cotton. There was a dense growth of purslane, stink grass, and some pigweed and crabgrass in each plot. One pair of rows was sprayed with an aqueous suspension of norea and surfactant, a second with a suspension of norea, surfactant (½% based on water) and DSMA, and a third with an aqueous solution of DSMA. The rates of application per acre and results are tabulated below:

| Herbicide | Rate, pounds/ acre | Time of application (percent weed control) | | |
|---|---|---|---|---|
| | | Cotyledon weeds | 1st true leaf weeds | 2–3 true leaves weeds |
| Norea | 1.2 | 95 | 83 | 57 |
| Norea+DSMA | 1.2+1.5 | 98 | 90 | 79 |
| DSMA | 1.5 | 21 | 24 | 0 |

The time of application is that at which the stage of growth of the cotton is indicated. The weeds were in various stages of growth. The climatic conditions were moist and favorable for weed growth as indicated by the low activity of the DSMA alone under these conditions. The cotton was not injured in the 2–3 true-leaf stage and only slightly injured in the earlier stages.

Example 7

A field of cotton 4–10 inches in height infested with a dense growth of cocklebur 2–3 leaves, 4–6 inches high, morning glory, 12 inch vines, Johnson grass 8–16 inches tall, crabgrass, nutgrass, coffee weed, poverty weed and carpet weed was divided into one-acre plots for treatment. The plots were separately treated with A. DSMA 0.5 pound per acre
B. MSMA 0.5 pound per acre
C. Norea 0.5 pound per acre
D. Norea 0.5 pound per acre plus DSMA 0.5 pound per acre
E. Norea 0.5 pound per acre plus MSMA 0.5 pound per acre The water used contained ½% surfactant. After the treatment the daytime temperature was 80–90° F. and the field was moist for the following 2 weeks at the end of which time the results were as follows:

| Plot treatment | Degree of injury (10=complete kill) | | | |
|---|---|---|---|---|
| | Morning glory | Poverty weed | Coffee weed | Carpet weed |
| A | 2 | 0 | 3 | 10 |
| B | 2 | 0 | 2 | 10 |
| C | 0 | 0 | 1 | 8 |
| D | 3 | 3 | 2 | 10 |
| E | 5 | 3 | 4 | 10 |

These data indicate that DSMA and MSMA are substantially equivalent. They also show improved results for the combinations of this invention over the individual components of the combinations.

Example 8

The following 2-row portions of a field of cotton in which the cotton was well developed, but the rows were infested with 3–6 inch watergrass, were sprayed with the indicated amounts of norea and MSMA, alone and in compositions containing both, dispersed with ½% surfactant in water:

| Herbicide composition | Norea, pounds/acre | MSMA, pounds/acre | Watergrass control data |
|---|---|---|---|
| A | ¼ | 3 | Growth stopped. |
| B | ½ | 3 | Do. |
| C | ¾ | 3 | Do. |
| D | 0 | 3 | Nil. |
| E | ¼ | 0 | Nil. |
| F | ¾ | 0 | Slight burn. |

The data on control were obtained before the weeds had completely died. During this time the daytime temperature was around 100° F. and there was no rain but the fields were kept moist by irrigation. Although the watergrass did not die during the period of this test, the other weeds were killed and the cotton continued to grow unaffected by the treatment.

Example 9

A cotton field infested with weeds and grass up to about 1 inch height was sprayed on contiguous 7 inch bands each side of the row with a mixture of ½ pound 80% norea and 1 pound DSMA suspended in 12 gallons of water containing ½% surfactant to cover an area totaling 1 acre. An adjacent field was similarly treated with the DSMA spray solution without the norea. After 4 days, the weeds in the field treated with the DSMA-norea mixture were killed while the weeds in the field treated with DSMA without norea were merely yellowed and there was no certainty that they would not recover in the event of a rain. After 14 days without rain the kill was also complete on the DSMA treated field. The weeds in these fields included pigweed, cockleburs, morning glory, and crabgrass.

The growth regulating materials in the compositions of this invention, i.e., the norea and salt of methyl arsonic acid are absorbed by the leafy part of the weeds and are best absorbed when well distributed over the leaves. The surfactant aids in this distribution and consequent absorption. Any surfactant which aids in spreading the solution over the leaves is effective in aiding the absorption and may be selected from the classes of anionic, cationic or nonionic surfactants examples of which are well known in the herbicide art. The amount is not critical but at least an effective amount for producing an aqueous dispersion is used. Dodecyl ether of poly(ethylene glycol) is preferred as the surfactant.

In addition to the surfactant there may be present a clay or similar powder so that the composition is a solid wettable powder. In the case of a liquid composition there may also be present liquefying aids to aid in pouring into water. These include hydrocarbon solvents such as benzene, toluene, xylene, kerosene and the like and lower alcohols and ketones.

Weeds controlled by the composition of this invention include:

| | |
|---|---|
| Morning glory | Fall panicum |
| Cocklebur | Maypop |
| Crabgrass | Coffee weed |
| Hurrah grass (Colorado grass) | Florida pussley |
| | Sandspurs |
| Watergrass | Mustard |
| Nutgrass | Barnyard grass |
| Purslane | Smartweed |
| Stinkgrass | Bull nettle |
| Pigweed (careless weed) | Blue stem |
| Goosegrass | Tea weed |
| Annual sedge | Carpet weed |

The composition of this invention is useful in regulating the growth of weeds not only in cotton fields but also in other crops as well and are characterized by their increase in the rate of checking of the growth of the weeds over the rate when either of the herbicidal components is used alone.

What I claim and desire to protect by Letters Patent is:
1. The method of inhibiting the growth of weeds of both broadleaf and grassy species which comprises applying to the leafy parts of the weeds a mixture of 1-(tetrahydrodicyclopentadienyl)-3,3-dimethyl urea and a salt of methyl arsonic acid in a ratio in the range of 1:3 to 1:1 at a rate of 1 to 6 pounds of said mixture per acre, said salt being an alkali metal salt of methyl arsonic acid, or an ammonium, ethanolamine, diethanolamine, pentylamine, or octylamine salt of methyl arsonic acid.

2. The method of claim 1 in which the methyl arsonic acid salt is a sodium salt.

3. A water dispersible composition for inhibiting the growth of weeds of both broadleaf and grassy species under both moist and parched conditions which comprises a mixture of 1-(tetrahydrodicyclopentadienyl)-3,3-dimethyl urea, and a salt of methyl arsonic acid in which the ratio of 1-(tetrahydrodicyclopentadienyl)-3,3-dimethyl urea to salt of methyl arsonic acid is in the range of 1:3 to 1:1, said salt being an alkali metal salt of methyl arsonic acid, or an ammonium, ethanolamine, diethanolamine, pentylamine, or octylamine salt of methyl arsonic acid.

4. A composition of claim 3 in which the salt is a sodium salt of methyl arsonic acid.

References Cited

UNITED STATES PATENTS

| | | | |
|---|---|---|---|
| 3,342,584 | 9/1967 | Harnden et al. | 71—97 |
| 2,709,648 | 5/1955 | Ryker et al. | 71—9.7 X |
| 3,304,167 | 2/1967 | Buntin et al. | 71—119 X |

OTHER REFERENCES

Frans: Proceedings Fifteenth Annual Meeting of the Southern Weed Conference, January 1962, pages 78 to 84.

JAMES O. THOMAS, JR., *Primary Examiner.*